United States Patent [19]
Watanabe

[11] Patent Number: 4,619,675
[45] Date of Patent: Oct. 28, 1986

[54] FILTER FOR AIR CLEANERS

[75] Inventor: Moritsuna Watanabe, Tokyo, Japan

[73] Assignee: Midori Anzen Co., Ltd., Tokyo, Japan

[21] Appl. No.: 705,332

[22] PCT Filed: Jun. 22, 1984

[86] PCT No.: PCT/JP84/00326
§ 371 Date: Feb. 12, 1985
§ 102(e) Date: Feb. 12, 1985

[87] PCT Pub. No.: WO85/00116
PCT Pub. Date: Jan. 17, 1985

[30] Foreign Application Priority Data
Jun. 24, 1983 [JP] Japan .................................. 58-96720

[51] Int. Cl.4 ............................................. B01D 27/06
[52] U.S. Cl. ........................................ 55/498; 55/521
[58] Field of Search ................. 55/498, 499, 521, 497, 55/500

[56] References Cited
U.S. PATENT DOCUMENTS

| 3,402,531 | 9/1968 | Farr | 55/499 X |
| 3,803,817 | 4/1974 | Lewis | 55/498 |
| 4,323,374 | 4/1982 | Shinegawa et al. | 55/521 X |
| 4,422,861 | 12/1983 | Dusza | 55/498 |

FOREIGN PATENT DOCUMENTS

| 2034670 | 7/1970 | Fed. Rep. of Germany | 55/521 |
| 2407329 | 9/1974 | Fed. Rep. of Germany | 55/521 |
| 0093954 | 6/1983 | Japan | 55/498 |

Primary Examiner—Charles Hart
Attorney, Agent, or Firm—Koda and Androlia

[57] ABSTRACT

A filter used for air cleaners. In this filter, a filter medium, which is obtained by folding a piece of elongated filter paper so that ridges and valleys are formed alternately, fitting spacers on this folded filter paper so as to maintain the spaces among the ridges and valleys properly, and then bending the resultant product so that the ridges and valleys extend in the radial direction, is set in a filter body having air inlet and outlet ports. A cushion material is inserted between the contact portions of the filter body and filter medium.

3 Claims, 7 Drawing Figures

FILTER FOR AIR CLEANERS

TECHNICAL FIELD

This invention relates to a filter used for an air cleaner set in an air suction port of a dust protective mask and a gas mask, or an air feed port of a computer, an air-conditioner, a vacuum cleaner and a room.

BACKGROUND ART

The conventional filters for air cleaners include a filter which is made by compressing the conically-molded filter paper from the above in a plurality of steps into a concentrically-folded structure, or folding the flat filter paper in the shape of the teeth of a saw as shown in FIGS. 6 and 7, and which is set in a filter body having air inlet and outlet ports. However, this filter for air cleaners has the following drawbacks. The area of the filtering surface of the filter cannot be increased greatly in comparison with the cross-sectional area of an air-passing portion thereof. The impact strength of the filter medium is low, and the steps of manufacturing the filter medium are complicated. The cost of manufacturing the filter medium is high.

An object of the present invention is to provide a filter for air cleaners, having a large effective area in comparison with the cross-sectional area of an air-passing portion thereof, and a high impact strength.

DISCLOSURE OF INVENTION

The present invention is directed to a filter consisting of a filter medium, which is obtained by folding a piece of elongated filter paper so that ridges and valleys are formed alternately, fitting spacers on this folded filter paper so as to maintain the spaces among the ridges and valleys properly, and then bending the resultant product so that the ridges and valleys extend in the radial direction, and which is set in a filter body having air inlet and outlet ports. Owing to such construction, a filter for air cleaners, having a large effective area in comparison with the cross-sectional area of an air-passing portion thereof, and a high impact strength, and capable of being manufactured at a low cost, can be obtained.

According to the present invention, a cushion material is interposed between the inner circumferential surface of the filter medium and an inner wall of a filter body and/or between the outer circumferential surface of the filter medium and an outer wall of the filter body. Thus, the shock can be absorbed to prevent the filter medium and the filter body from being broken, and the air-tightness of the contact portions of the filter medium and filter body can be improved. According to the invention, a cushion material is also bonded to the outer circumferential surface of the outer wall of the article. This enables the shock to be absorbed to prevent the filter for air cleaners from being broken, and serves to improve the air-tightness of the contact portions of the filter body and a case housing the filter for air cleaners.

BEST MODE FOR CARRYING OUT THE INVENTION

Figure 1:
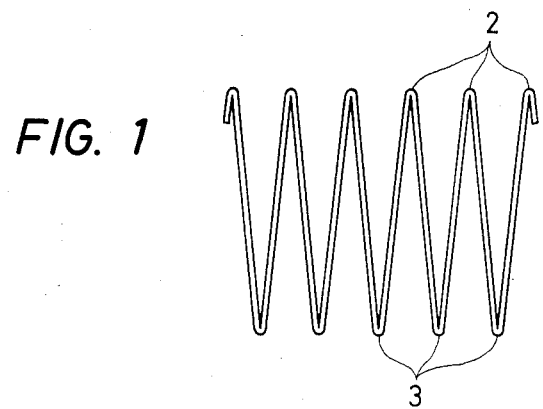
FIG. 1 illustrates the filter paper in a folded state.
Figure 2:
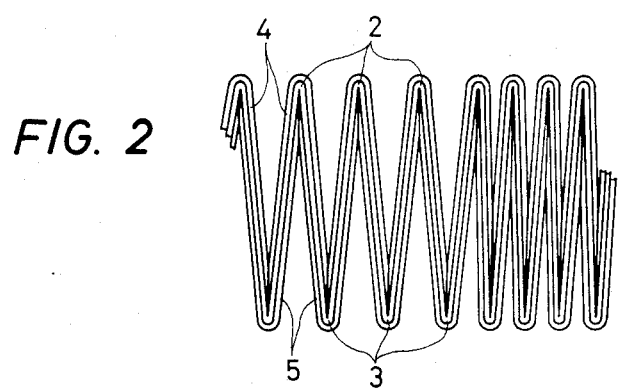
FIG. 2 illustrates the folded filter paper compressed partially by the spacers fitted thereon.
Figure 3:
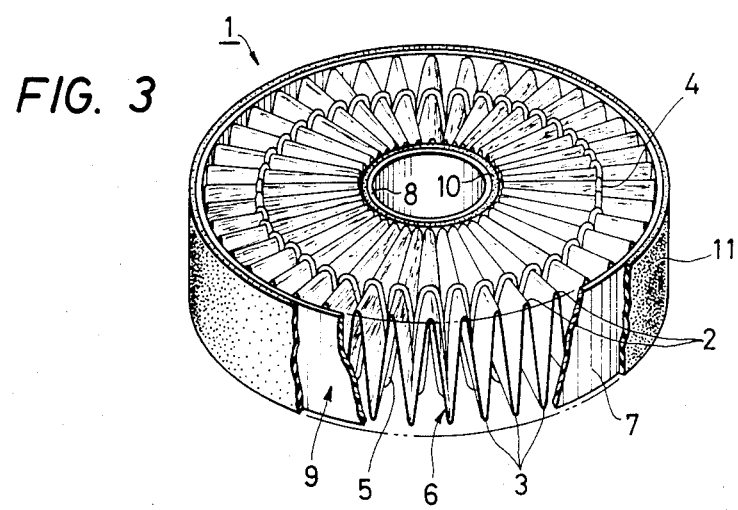
FIG. 3 is a partially cutaway view in perspective of a filter for air cleaners according to the present invention.

The present invention will now be described more in detail with reference to the accompanying drawings. Reference numeral 1 denotes a filter for an air cleaner set in an air suction port of a dust protective mask and a gas mask. The filter 1 is made by folding the elongated filter paper so that ridges 2 and valleys 3 are formed alternately as shown in FIG. 1, fitting string type or comb type spacers 4, 5 on the folded filter paper so as to maintain the distance between the adjacent ridges 2, 2 and valleys 3, 3 in a predetermined level as shown in FIG. 2, and then bending this folded filter paper so as to form a circular body in which the ridges 2 and valleys 3 extend radially. A filter medium 6 thus shaped is fitted in the interior of a filter body 9, which has a circular outer wall 7 and a circular inner wall 8, as shown in FIG. 3, so that the outer circumferential surface of the filter medium 6 air-tightly contacts the outer wall 7. A cushion material 10 molded out of a resin having closed cells is inserted between the inner circumferential surface of the filter medium 6 and the inner wall 8 so that the inner circumferential surface of the filter medium 6 air-tightly contacts the cushion material 10. A cushion material 11 which is molded out of the same material as the cushion material 10 is bonded to the outer circumferential surface of the outer wall 7.

The spacers 4, 5 may be fitted on the elongated filter paper after the latter is folded so as to form the alternate ridges and valleys. The string type plastic materials may be thermally fused to the elongated filter paper in advance; the resultant filter paper is folded so as to form the alternate ridges and valleys as well as the spacers of the string type plastic materials simultaneously. Various other types of spacers can be employed.

Figure 4:
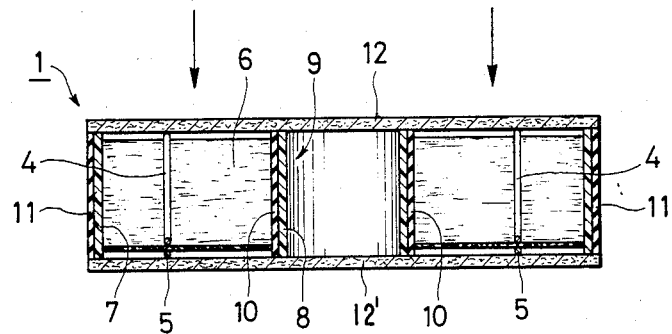
FIG. 4 is a sectional view showing an example of a mode of use of the same filter for air cleaners.

The mode of use of the filter 1 of the above-mentioned construction for air cleaners will now be described. As shown in FIG. 4, the air inlet port of the filter body 9 is covered with a pre-filter member 12, and the air outlet port thereof with an after-filter member 13. The resultant product is set in an air suction port provided at the left and right portions or in the central portion of a dust protective mask or a gas mask, and the mask is then stored in an air vent-carrying air cleaner storage case so that a person who wears the mask can always breathe the clean air. The active carbon or a gas adsorbent can be packed in the space between the filter medium 6 and after-filter member 13 and the space between the filter medium 6 and pre-filter medium 12 in the filter 1 for air cleaners.

According to the present invention, the cushion materials 10, 11 in the above embodiment are omitted in some cases to air-tightly bond the outer circumferential surface of the filter medium 6 to the outer wall 7 of the filter body 9, and the inner circumferential surface of the filter medium 6 to the inner wall 8 of the filter body 9.

Figure 5:
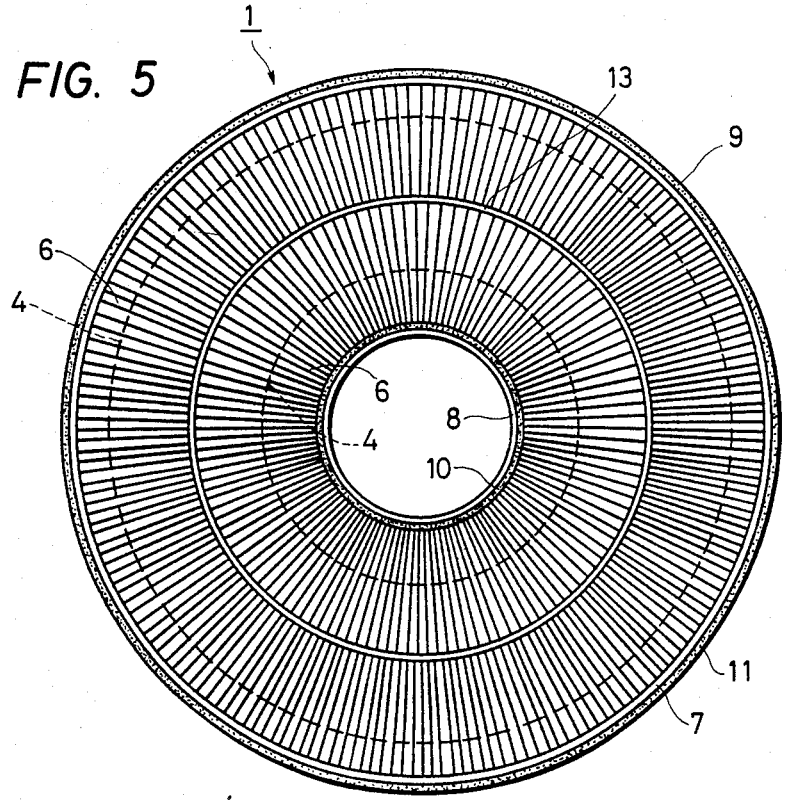
FIG. 5 illustrates a modified example of the present invention.
Figure 6:
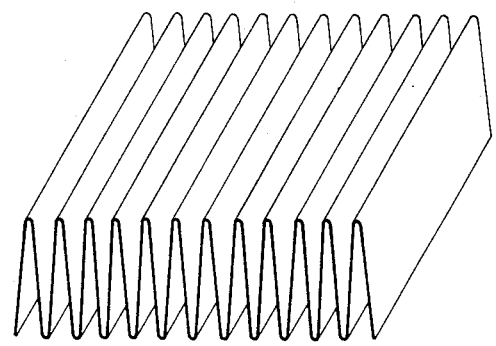
FIG. 6 is a perspective view of an example of a conventional filter for air cleaners.
Figure 7:
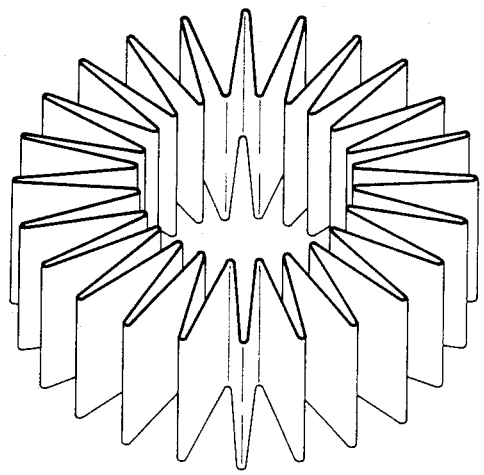
FIG. 7 is a perspective view of another example of a conventional filter for air cleaners.

According to the present invention, the outer wall 7 of the filter body 1 for air cleaners in the above embodiment may be enlarged as shown in FIG. 5, to provide a concentric partition 13 in the position therein which is halfway between the outer and inner walls 7, 8, and pack the filter medium 6 in the spaces on the inner and outer sides of the partition 13, i.e. form a double layer of the filter medium 6; or provide an increased number of partitions 13 in the enlarged filter body 1 to form a multi-layer of the filter medium 6. The cushion materials may be bonded to the inner and outer surfaces of each partition 13, and each partition 13 may be made of a cushion material.

The filter according to the present invention is set in the suction port of a dust protective mask and a gas mask, and may also be set in the air feed port of a computer, an air-conditioner, a vacuum cleaner, a room, and a space in which the clean air is needed.

As mentioned above, the filter according to the present invention consists of a filter medium, which is obtained by folding a piece of elongated filter paper so that ridges and valleys are formed alternately, fitting spacers on this folded filter paper so as to maintain the spaces among the ridges and valleys properly, and then bending the resultant product so that the ridges and valleys extend in the radial direction, and which is set in a filter body having air inlet and outlet ports. Therefore, the ratio of the effective area of this filter to the cross-sectional area of an air-passing portion thereof can be increased greatly as compared with that in a conventional filter for air cleaners. Moreover, even when a shock is imparted to the filter medium, it is scattered in the radial direction to maintain the distance between the adjacent ridges and valleys properly by the spacers, so that the impact strength of the filter medium can be improved. In addition, the steps of manufacturing the filter medium can be simplified, and the cost of manufacturing the same can be reduced. Accordingly, an inexpensive air cleaner can be provided. Owing to the cushion materials inserted between the inner circumferential surface of the filter medium and the inner wall of the filter body and between the outer circumferential surface of the filter medium and the outer wall of the filter body, and the cushion material bonded to the outer circumferential surface of the outer wall of the filter body, a shock imparted to the air cleaner as a whole can be absorbed effectively to prevent the air cleaner from being broken. Moreover, these cushion materials serve as packings to increase the airtightness of the contact portions of the filter medium and filter body and the contact portions of the filter body and storage case for the filter for air cleaners.

Industrial Applicability

Since the present invention has the above-mentioned effects, it can be effectively used as a filter for the air cleaner set in the air suction port of a dust protective mask and a gas mask, and as a filter for the air cleaner set in the air feed port of a computer, an air conditioner, a vacuum cleaner, a room, and a space in which the clean air is needed.

What is claimed is:

1. A filter for air cleaners, comprising a filter medium obtained by folding a piece of elongated filter paper so that ridges and valleys are formed alternately, fitting spacers only onto a portion of said folded filter paper which does not include the edges of the folded filter paper so as to maintain the distances between the adjacent ridges and valleys properly, and then bending the resultant product to form a circular body with inner and outer circumferential surfaces and with the ridges and valleys extending in the radial direction, a filter body having inlet and outlet ports and circular inner and outer circumferential walls, said filter medium being set in said filter body between said inner and outer circumferential walls, a cushion material inserted between the inner circumferential surface of said filter medium and the inner wall of said filter body, and a cushion material bonded to the outer wall and inserted between the outer circumferential wall of said filter medium and the outer wall of said filter body, a prefilter member covering said air inlet port and an after-filter member covering said outlet port.

2. A filter for air cleaners according to claim 1, wherein said filter body has one or a plurality of partitions therein by which the interior of said filter body is divided into concentric spaces, said filter medium being fitted in each of the concentric spaces defined by said partition.

3. A filter for air cleaners according to claim 2, wherein said partition consists of a cushion material.

* * * * *